United States Patent [19]

Parks

[11] Patent Number: 6,038,573

[45] Date of Patent: Mar. 14, 2000

[54] NEWS STORY MARKUP LANGUAGE AND SYSTEM AND PROCESS FOR EDITING AND PROCESSING DOCUMENTS

[75] Inventor: David Michael Parks, San Jose, Calif.

[73] Assignee: Avid Technology, Inc., Tewksbury, Mass.

[21] Appl. No.: 08/832,866

[22] Filed: Apr. 4, 1997

[51] Int. Cl.[7] .................................................. G06F 17/21
[52] U.S. Cl. .......................................................... 707/513
[58] Field of Search ................................ 707/515, 3, 9, 707/6, 513; 395/200.36, 200.49; 345/327

[56] References Cited

U.S. PATENT DOCUMENTS

| | | | |
|---|---|---|---|
| 4,843,468 | 6/1989 | Drewery | 358/140 |
| 5,012,334 | 4/1991 | Etra | 358/102 |
| 5,115,310 | 5/1992 | Takano et al. . | |
| 5,122,972 | 6/1992 | Richards et al. . | |
| 5,196,933 | 3/1993 | Henot . | |
| 5,237,648 | 8/1993 | Millis et al. | 345/433 |
| 5,267,351 | 11/1993 | Reber et al. | 395/600 |
| 5,274,758 | 12/1993 | Beitel et al. | 345/302 |
| 5,388,197 | 2/1995 | Rayner . | |
| 5,404,316 | 4/1995 | Klingler et al. | 707/530 |
| 5,426,513 | 6/1995 | Scorse et al. | 358/433 |
| 5,442,744 | 8/1995 | Piech et al. | 345/302 |
| 5,488,433 | 1/1996 | Washino et al. . | |
| 5,493,568 | 2/1996 | Sampat et al. | 370/60 |
| 5,513,306 | 4/1996 | Millis et al. | 707/530 |
| 5,530,852 | 6/1996 | Meske, Jr. et al. | 395/200.36 |
| 5,537,157 | 7/1996 | Washino et al. . | |
| 5,613,057 | 3/1997 | Caravel | 345/302 |
| 5,623,308 | 4/1997 | Civanlar et al. | 348/392 |
| 5,659,793 | 8/1997 | Escobar et al. | 345/302 |
| 5,664,216 | 9/1997 | Blumenau | 345/302 |
| 5,682,326 | 10/1997 | Klingler et al. | 345/302 X |
| 5,706,290 | 1/1998 | Shaw et al. | 370/465 |
| 5,708,960 | 1/1998 | Kamisaka et al. | 455/3.2 |
| 5,815,663 | 9/1998 | Uomini | 395/200.49 |
| 5,815,830 | 9/1998 | Anthony | 707/6 |
| 5,819,271 | 10/1998 | Mahoney et al. | 707/9 |
| 5,835,087 | 11/1998 | Herz et al. | 345/327 |
| 5,852,435 | 12/1998 | Vigneaux et al. | 345/302 |

FOREIGN PATENT DOCUMENTS

| | | |
|---|---|---|
| WO 94/11806 | 5/1994 | WIPO . |
| WO 94/29868 | 12/1994 | WIPO . |

OTHER PUBLICATIONS

Rakesh Mohan, "Text–Based Search for TV News Stories," Nov. 1996, Proceedings of the SPIE, vol. 2916, pp. 2–13.

Paul England, et al., "RAVE: Real–Time Services for the Web," May 1996, 5th International World Wide Web Conference, vol. 28, No. 7–11, Computer Networks and ISDN Systems, pp. 1547–1558.

(List continued on next page.)

*Primary Examiner*—James P. Trammell
*Assistant Examiner*—John Leonard
*Attorney, Agent, or Firm*—Wolf, Greenfield & Sacks, P.C.

[57] ABSTRACT

The present invention defines a news story document format that supports a wide variety of news story information in a structured manner. The news story markup language of the present invention provides constraints to define timing information for a news story, to define machine control commands that may be used to automate control functions, or to associate multiple elements within one or more documents for the purpose of synchronizing the elements. The present invention defines a system and method for editing and processing news story documents.

20 Claims, 14 Drawing Sheets

OTHER PUBLICATIONS

Blair Wheeler, "A Closer Look at the Avidnews Client," Jan. 1997, Broadcast Update Avid Technology's Broadcast Industry Newsletter, vol. 2, No. 1, pp. 1–13.

H. Gröger, "DER Digitale Newsroom the 'Avidnews'" Nov. 1996, Fernseh–und Kino–Technik, vol. 50, No. 11, pp. 654–656.

M. Tamer Özsu, et al., "An Object–Oriented Multimedia Database System For a News–On–Demandapplication," 1995, Multimedia Systems, vol. 3, No. 5–6, pp. 182–203.

U.S. application No. 08/833,277, Loveman et al., filed Apr. 4, 1997.

U.S. application No. 08/832,868, Porrka et al., filed Apr. 4, 1997.

Bentley et al, Supporting Coillaborative Information Sharing with the World Wide Web: The BSCW Shared Workspace System, Issue 1, Dec. 1995, pp. 63–74, available at http://bscw.gmd.de/Papers.

J. Libri, E facile internet, Capitulo 8: Comunicare con la posta elettronica, 1997, pp. 78–79 and Netscape Mail, version 2.02, 1994 screenprints.

Compton et al., "Internet CNN Newsroom: A Digital Video News Magazine and Library," May 15, 1995, pp. 296–301.

Barbara D et al., "The Gold Mailer," Proceedings of the International Conference on Data Engineering, Vienna, Apr. 19–23, 1993, IEEE, pp. 92–99, XP000380173.

DIRECTORY AREA
251

- Local Files
  - Contacts
  - Notes
  - Stories
    - 06/29/96
    - Mayoral Race — 254
    - 06/30/96
    - 06/31/96
  - Personal
- News Server
  - Desk
  - Templates
  - Rundowns
  - People

QUEUE AREA
252

| PAGE | SLUG | ANCHOR | FORMAT | TAPE | BACKTIME | CAMERA | NOTES |
|------|-------|--------|--------|------|----------|--------|-------|
| A01  | NEWS  | ML     | VO     | 1000 | 0:25     |        |       |
| A02  | MAYOR | ML     | VO     | 455  | 1:01     |        |       |

— 255

STORY AREA
243

IN AN INTERVIEW TODAY WITH MAYOR WILSON, THE MAYOR HAD THE FOLLOWING COMMENTS. ●

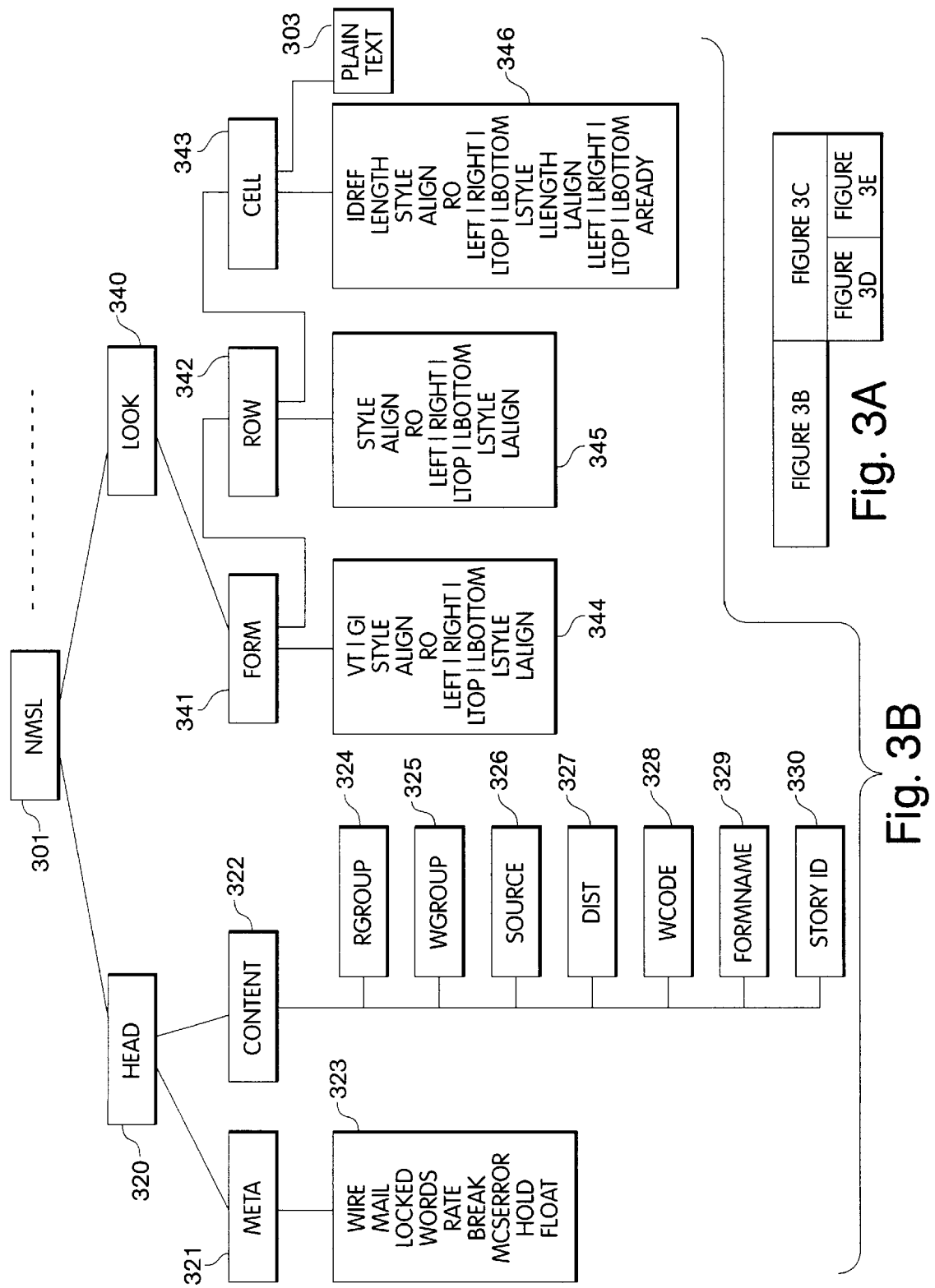

| ELEMENT | GRAMMAR RULE |
|---|---|
| NSML 301 | nsml_tag ::= <nsml><br>　　　　[ head_tag ]<br>　　　　[ look_tag ]<br>　　　　[ story_tag ]<br>　　　</nsml> |
| HEAD 320 | head_tag ::= <head><br>　　　　[ <meta> ]<br>　　　　[ <storyid> plain_text </storyid> ]<br>　　　　[ <formname> plain_text </formname> ]<br>　　　　[ <rgroup> plain_text </rgroup> ]<br>　　　　[ <wgroup> plain_text </wgroup> ]<br>　　　　[ <source> plain_text </source> ]<br>　　　　[ <dist> plain_text </dist> ]<br>　　　　[ <wcode> plain_text </wcode> ]<br>　　　</head> |
| LOOK 340 | look_tag ::= <look><br>　　　　{ form_tag }<br>　　　</look> |
| FORM 341 | form_tag ::= <form><br>　　　　{ row_tag }<br>　　　</form> |
| STORY 360 | story_tag ::= <story><br>　　　　[ fields_tag ]<br>　　　　[ body_tag ]<br>　　　　[ aeset_tag ]<br>　　　</story> |
| ROW 342 | row_tag ::= <row><br>　　　　{ cell_tag }<br>　　　</row> |
| CELL 343 | cell_tag ::= <cell><br>　　　　plain_text<br>　　　</cell> |

Fig. 4A

| ELEMENT | GRAMMAR RULE |
|---|---|
| FIELDS 361 | fields_tag ::= \<fields\><br>    { f_tag }<br>    \</fields\> |
| F_TAG 364 | f_tag ::= \<f\><br>    plain_text<br>    \</f\> |
| BODY 362 | body_tag ::= \<body\><br>    { p_tag }<br>    \</body\> |
| P_TAG 366 | p_tag ::= \<p\><br>    { p_content }<br>    \</p\> |
| P_CONTENT 371 | p_content ::= content_tag<br>    \| text |
| PI_CC_TAG 373 | content_tag ::= \<pi\> text \</pi\><br>    \| \<cc\> text \</cc\> |
| TEXT 372 | text ::= { text_content } |
| TEXT_CONTENT 390 | text_content ::= \<pb\><br>    \| \<tab\><br>    \| \<wp\><br>    \| \<a\><br>    \| style_tag<br>    \| plain_text |
| STYLE 395 | style_tag ::= \<b\> text \</b\><br>    \| \<i\> text \</i\><br>    \| \<u\> text \</u\> |
| AESET 363 | aeset_tag ::= \<aeset\><br>    { ae_tag }<br>    \</aeset\> |
| AE_TAG 368 | ae_tag ::= \<ae\><br>    { ae_content }<br>    \</ae\> |

Fig. 4B

| ELEMENT | GRAMMAR RULE |
|---|---|
| AE_CONTENT 374 | ae_content ::= \<img\><br>    \| mc_tag<br>    \| ap_tag |
| MC_TAG 375 | mc_tag ::= \<mc\><br>      { ap_tag }<br>    \</mc\> |
| AP_TAG 376 | ap_tag ::= \<ap\><br>      ap_text<br>    \</ap\> |
| AP_TEXT 378 | ap_text ::= { ap_content } |
| AP_CONTENT 379 | ap_content ::= \<tab\><br>    \| \<wp\><br>    \| astyle_tag<br>    \| plain_text |
| ASTYLE 382 | astyle_tag ::= \<b\> ap_text \</b\><br>    \| \<i\> ap_text \</i\><br>    \| \<u\> ap_text \</u\> |

Fig. 4C

EXAMPLE NSML DOCUMENT 500

```
<nsml>
    <look><form gi>
        <row lstyle="b i" ltop>
            <cell idref=PAGE-NUMBER length=18 llength=18>PAG
            <cell idref=PRESENTER length=18 llength=18 style=i>TAL
            <cell idref=VAR-1 length=18 llength=18>CAM
            <cell idref=VAR-2 length=30 llength=30>EFFX
            <cell idref=TITLE length=102 llength=102>STORY
            <cell idref=VAR-3 length=18 llength=18>WRT
            <cell idref=VAR-4 length=48 llength=486>SOURCE
            <cell idref=APP1-1 length=30 llength=30>TAPE#
            <cell idref=AFF-READY-1 length=48 llength=48 aready>STATUS
            <cell idref=AUDIO-TIME length=30 llength=30>TIME
            <cell idref=BACK-TIME length=36 llength=36>BKTIME
            <cell idref=READY length=6 llength=6 ro>?
            <cell idref=VAR-5 length=6 llength=6 style=i>P
        <row lleft lstyle=i style=u>
            <cell idref=MODIFY-DATE length=126 llength=60 ro>Modified:
            <cell idref=MODIFY-BY length=48 llength=24 ro>By:
            <cell idref=VAR-6 length=144 llength=60>Comments:
    </form></look>
    <story><fields>
        <f id=PAGE-NUMBER>75
        <f id=PRESENTER>SB*
        <f id=VAR-1>C 2
        <f id=VAR-2>2 SHT
        <f id=TITLE>TEASE/BREAK
        <f id=VAR-3>KG*
        <f id=VAR-4>********
        <f id=AFF-READY-1 aready>
        <f id=AUDIO-TIME uec>130
        <f id=READY>R
        <f id=VAR-5>*
        <f id=VAR-6>**
    </fields>
    <body script=186 width=234>
        <p><a idref=1><a idref=2>
        <p>    (BELL)
        <p>
        <p>    STILL AHEAD ON EYEWITNESS NEWS...
        <p>
            THE MAXWELL CLUB HONORS SOME OF <wp>
            OUR AREA'S BEST HIGH SCHOOL FOOTBALL <wp>
            PLAYERS. YOU'LL MEET THEM... COMING <wp>
            UP.</p>
    </body>
    <aeset>
        <ae id=1><ap><i>VO ENG</ap>
        <ae id=2><mc><ap>cg2 Coming Up Next </ae>
    </aeset>
    </story>
</nsml>
```

Fig. 5

| NMSL FORMAT | HTML FORMAT |
|---|---|
| <NSML>, </NSML> | <HTML>, </HTML> |
| " | " |
| < | < |
| > | > |
| & | & |
| <literal characters> | <literal characters> |
| <underlined text> | <U><underlined text></U> |
| <bold text> | <B><bold text></B> |
| <reverse text> | <I><reverse text></I> |
| <bold reverse text> | <B><I><bold reverse text></I></B> |
| <plain text> | <P><plain text></P> |
| <leading space at beginning of paragraphs> |   |
| <text not to be read on air> | <!--<text not to be read on air<--!> |

Fig. 6

NEWS STORY MARKUP LANGUAGE AND SYSTEM AND PROCESS FOR EDITING AND PROCESSING DOCUMENTS

FIELD OF THE INVENTION

The present invention relates generally to a markup language and system for processing electronic documents using the markup language. Specifically, the invention relates to a markup language used for generating news story documents and a system and method for editing and processing news story documents.

BACKGROUND OF THE INVENTION

The television broadcast news industry has evolved from communicating information with paper and teletype formats to computer based information transfer systems that transfer electronic documents. Currently, specialized computer systems assist in news production, promotion and distribution of electronic documents to allow newsroom personnel to perform their functions more efficiently. Also, these specialized computer systems can store a wide variety of news media such as text, still images, and broadcast motion video for distribution within the newsroom and for transmission to external destinations.

News story information is generally shared by a number of different users with different information requirements. Generally, journalists, producers, directors, and announcers share news story information. In addition, news story information is made available on a wide variety of distribution media, such as video, teleprompters, journalist edit stations, and the like. Thus, a computer system that stores news story information should be able to provide news story information to different information consumers. In addition, with the rise in distribution of news information over the Internet via the World Wide Web (WWW), a larger audience of consumers of news story information exists. A common format for news story information that meets the requirements of a wide variety of consumers would be beneficial.

The Standard Generalized Markup Language ("SGML") is used to represent a wide variety of document types such as books, electronic software documentation, and equipment specifications, among other applications. SGML is an international standard (ISO-8879) published in 1986 for the electronic publication of documents. SGML defines a markup language wherein content of a document is structured using markup, i.e., tags or codes encapsulating the content. The markup defines elements which form a logical, predictable structure. SGML defines a strict markup scheme with a syntax for defining document elements and an overall framework for marking up documents. A document type definition (DTD) of SGML establishes the structure of a markup document of a particular type, and provides a framework for the kinds of elements that constitute a document of that type. The markup of a document is interpreted as an ordered hierarchy of markup elements when, taken together, form a tree or similar hierarchial object. A markup element describes the function or meaning of the content which it includes.

In such a document, markup elements include tags and their content, such as text, graphics, still images or other media. An SGML document includes markup tags that may be described as start tags, end tags, or empty tags. A start tag begins a markup element. An end tag ends the corresponding markup element. These start tags and end tags define the element in SGML, such as a book, library, or body of a document. An empty tag is understood as being both a start tag and an end tag with no content between the start and end tags. Between a start tag and an end tag other start tags and corresponding end tags may be arranged in a hierarchial manner such that there are children elements and parent elements having a defined relationship to each other.

Also in SGML documents, there are elements that contain metadata, or information about the document. Metadata may describe document information such as location, name, and creation date of an electronic document that may accompany the document or may be embedded in the document itself. Metadata is typically used to catalogue electronic documents or otherwise identify information relative to an electronic document.

The Hypertext Markup Language (HTML) is a particular document type that conforms to SGML by having a definitive DTD. HTML is widely used over the Internet for distributing information between servers and clients. Both SGML and HTML can be edited, viewed and verified according to their respective DTDs. By distributing HTML documents through networks such as the Internet, information providers can rapidly disseminate information to a large number of consumers.

HTML and SGML documents are generally viewed using a software program referred to in the art as a browser or viewer. A viewer program interprets a series of elements of a markup language document as viewer instructions. The elements contain text or images, and a number of formatting commands, when interpreted, change the appearance of text or images within the viewer program. Some viewer programs also provide the capability for editing a markup language document in an environment described in the art as a "what-you-see-is-what-you-get" (WYSIWYG) environment. In a WYSIWYG editing environment, markup language document element formatting commands, which are normally seen by a normal ASCII text editor, are interpreted in the same manner as in a viewer program.

HTML provides a limited subset of elements within its DTD. The HTML DTD defines a set of tags that support document structures such as lists and emphasis of document elements. The HTML DTD also provides a relatively presentation-oriented model for small documents with limited internal structure. Thus, HTML has fewer features than its more complex counterpart, SGML.

As discussed above, there are many consumers of news story information. Consumers include people with different roles in the news production environment and different equipment types such as teleprompters, viewers, video equipment, and editing terminals. News story documents should contain sufficient information to identify and represent content of a news story for all likely consumers. For example, it may be desired to provide story information from an editor to a teleprompter to display the story to an announcer.

Since a number of different information consumers exist with different information requirements, a news story document format that supports a wide variety of news story information in a structured manner would be desirable.

For example, when presenting news story information during a news story broadcast, there may be a particular timing relationship between news stories. The timing relationship of a story should be tracked to provide additional information to a director or producer during the news story broadcast.

In another example, elements within a news story may have an explicit timing relationship, such as a synchronization. For example, after a certain amount of story text is read, say for a lead-in to an interview, a video tape must be played directly after the text for the lead-in is read. The director of the news broadcast must perform the correct command that plays the video tape.

In summary, both SGML and HGML are inadequate for presenting news story information. SGML is too general in that there are insufficient constraints on the content of a document, while HTML is too limited in structure. In particular, existing markup languages do not provide sufficient constraints to sufficiently define timing information that may be used to properly sequence news story information, to define machine control commands that may be used to automate control functions, or to associate multiple elements within one or more documents for the purpose of synchronizing the elements.

SUMMARY OF THE INVENTION

The present invention defines a news story document format that supports a wide variety of news story information in a structured manner. The news story markup language of the present invention provides constraints to define timing information for a news story, to define machine control commands that may be used to automate control functions, and to associate multiple elements within one or more documents for the purpose of synchronizing the elements. The present invention defines a system and method for editing and processing news story documents.

According to one aspect of the present invention, a news story document includes machine control elements for controlling news story production equipment such as a VCR or digital video device. In another embodiment of the present invention to provide a news story markup language document that includes story timing information used for sequencing news stories.

According to another aspect of the present invention, a process for processing markup language documents relating to a news story, comprising the steps of reading an input file having a first file format including a plurality of elements, the input file further including at least one of timing information for representing timing of the news story and synchronization information for synchronizing one of the plurality of elements with another of the plurality of elements. The input file also includes news story information for representing news story information. The process further includes a step of verifying the first file format of the input file based on a document type definition defining a news story markup language.

According to another aspect of the present invention, the process further includes the steps of producing output data having a second file format wherein the second file format is formatted according to the document type definition, and creating an output file based on the output data.

According to another aspect of the present invention, the process further comprises a step of converting the output file to a document file having a format different than the format of the output file. According to another aspect, the format of the document file is HTML format. Also, according to another aspect, the step of converting includes the step of excluding information from the output file when converting the output file to the document file format.

According to another aspect of the present invention, the process further comprises a step of importing an import file having a file format different than the first and second file formats to produce an imported file having a format according to the document type definition. According to another aspect, the step of importing includes the step of adding import file information to a template document having a format according to the document type definition.

According to another aspect of the present invention, the process further comprises a lexical analysis step of analyzing the input file format for a plurality of elements and identifiers, and of producing an output token stream based on the plurality of elements and identifiers.

According to another aspect of the present invention, the step of verifying further includes the steps of checking usage of a plurality of elements and identifiers according to the document type definition to produce a parse tree from the plurality of elements and identifiers, and generating an output file having a hierarchical file structure based on the parse tree that conforms to the document type definition. According to another aspect, the process further includes a step of interpreting the output file by a viewer.

According to another aspect of the present invention, a data processing system for interpreting a news story markup language document, the system comprises means for obtaining a news story markup language document from a storage location, means for parsing the news story markup language document, producing a plurality of markup language tags and associated text, and means for converting the plurality of markup language tags and associated text to system instructions.

According to another aspect of the present invention, the data processing system further comprises means for rendering the system instructions as a visual interpretation of the news story markup language document. According to another aspect, the data processing system further comprises a machine control server and means for converting one of said plurality of markup language tags and associated text to a machine control instruction for execution by the machine control server. According to another aspect, the data processing system further comprises a teleprompter and means for displaying story information in the teleprompter. According to another aspect, the machine control server controls a media presentation device based upon the machine control instruction.

According to another aspect of the present invention, the present invention defines a method of anchoring document text to a control field in the same electronic document in an electronic document editor, comprising the steps of creating an electronic document in a markup language, the electronic document including a declarative tag enclosing the document text, creating the control field in the electronic document, the control field having a unique identification and containing machine control information, and referencing, at a location within the document text, the control field by the unique identification.

According to another aspect of the present invention, the markup language is a news story markup language having news story information for representing content of the news story, news story information including look information for controlling appearance of new story information and head information for identifying the news story. According to another aspect, the machine control information identifies a presentation element associated with a media presentation device. Also, according to another aspect, the presentation element is a video element.

BRIEF DESCRIPTION OF THE DRAWINGS

In the drawing,

FIGS. 2C and 2D are example display views produced on the news story markup language viewer of FIGS. 2A and 2B;

FIGS. 3A–3E are diagrammatic illustrations of the hierarchical structure of the news story markup language;

FIGS. 4A–4C are tables describing the grammar of the news story markup language of FIGS. 3A–3E;

FIG. 5 shows an example of a news story markup language document; and

FIG. 6 is a chart representing an example mapping of the news story markup language format to hypertext markup language format.

DETAILED DESCRIPTION

The present invention will be more completely understood through the following detailed description which should be read in conjunction with the attached drawing in which similar reference numbers indicate similar structures. All references cited herein are hereby expressly incorporated by reference.

The following detailed description sets forth a news story document language format that may be created and used by number of systems. A system described in a U.S. patent application Ser. No. 08/832,868, filed on Apr. 4, 1997 by Jason Loveman, Mark Allen, Ron White and Charles Haynes entitled A MULTIMEDIA SYSTEM WITH IMPROVED DATA MANAGEMENT MECHANISMS, incorporated herein by reference, can act as a news story server that provides news story markup language documents to clients, other servers, viewers, and editors that receive and process such news story markup language documents. The system described in a U.S. patent application Ser. No. 08/833,277 filed on Apr. 4, 1997 by Joseph Porrka and Bruce Dawson entitled NEWSROOM USER INTERFACE INCLUDING MULTIPLE PANEL WORKSPACES, also incorporated herein by reference, describes a user interface for viewing and editing news story markup language documents.

Figure 1:
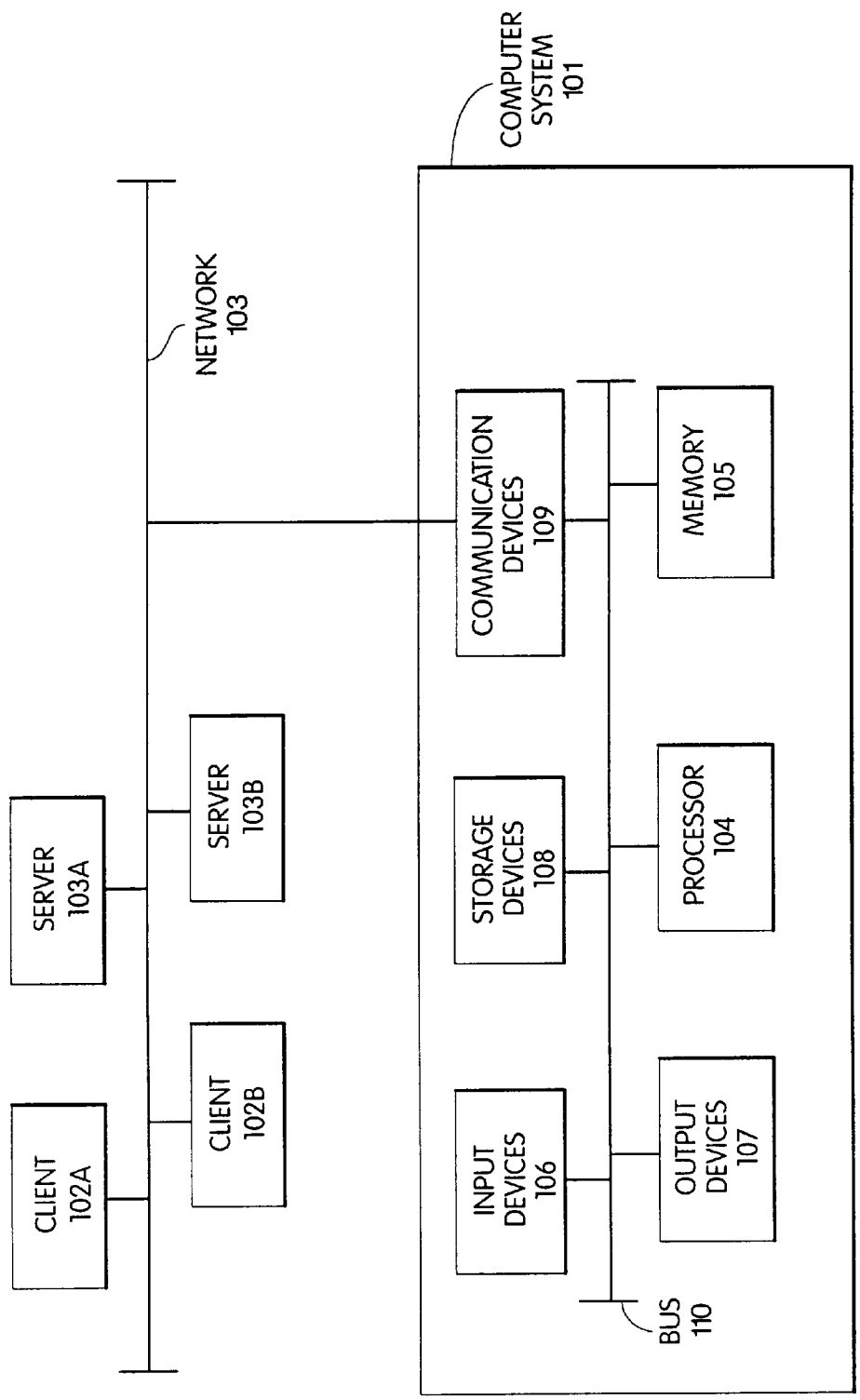
FIG. 1 is a block diagram of computer system and network which may be used to process the markup language of present invention.

An example computer system which may be used to practice the present invention is depicted in FIG. 1. The computer system 101 includes a processor 104 having one or more storage devices 108, such as a disk drive. The computer system also includes one or more output devices 107, such as a monitor or graphic display (not shown), or printing device (not shown). The computer system 101 typically includes a memory 105 for storing programs and data during operation of the computer system 101. In addition, the computer system may contain one or more communication devices 109 that connect to a communication network 111.

Computer system 101 may be a general purpose computer system, that is programmable using a high level computer programming language. The computer system may also be implemented using specially programmed, special purpose hardware. In the computer system 101, the processor 104 is typically a commercially available processor, such as the PENTIUM® microprocessor from the Intel Corporation, PowerPC® microprocessor, SPARC® processor, PA-RISC™ processor or 68000 series microprocessor. Many other processors are available. Such a processor usually executes an operating system which may be, for example, the DOS™, WINDOWS 95, WINDOWS NT, SYSTEM 7, SOLARIS, NetWare, Internet Ware®, IRIX®, or UNIX (WINDOWS is a registered trademark of the Microsoft Corporation, SYSTEM 7 is a registered trademark of the Apple Corporation, Solaris is a registered trademark of Sun Microsystems, Inc., IRIX is a trademark of the Silicon Graphics Corporation, and NetWare and Internet Ware® are registered trademarks of the Novell Corporation.)

The communication network 111 may be an ETHERNET™ or other type of local or wide area network (LAN or WAN), a point-to-point network provided by telephone services, or other type of communication network (ETHERNET is a trademark of the Xerox Corporation). Information consumers and providers referred to as server 102 and client 103 systems, respectively, communicate through the network 111 to exchange information. Computer system 101 may be configured to perform as a client 102 or server 103 system or both on the network 111. A server 103A may store news story documents according to the news story markup language of the present invention on a storage device 108 located on the server 103A. The server may also provide these news story documents to one or more client systems 102 in response to a request generated by a client 102A through the network 111. Similarly, news story documents according to the present invention may be created, edited, viewed, or converted on such client 102 and server 103 systems.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

The news story markup language (NSML) may be used to represent content and information about a news story. NSML may be based on SGML constructs such as elements and tags. In particular, NSML may be defined by a document type definition (DTD) (for SGML) according to the types of elements and tags desired. A DTD can be developed from a series of grammar rules that define a document format.

As discussed above with reference to SGML constructs, an NSML document includes elements, which in turn contain tags and text. Start and stop tags define the bounds of an element. Elements having start and end tags occurring between the start and end tags of another element are referred to as children, or descendants, of the containing element. The containing element is called a parent or ancestor element. Children with the same ancestors at the same level of hierarchy with a document are referred to as siblings.

In one embodiment, NSML can be used to express three separate aspects of a news story. NSML can be used to express metadata information about a news story in a head section, content of a news story in a story section, and appearance of the news story when displayed in a look section. Specific elements of NSML are described in more detail below in reference to FIGS. 3A–3E.

Figure 2A:
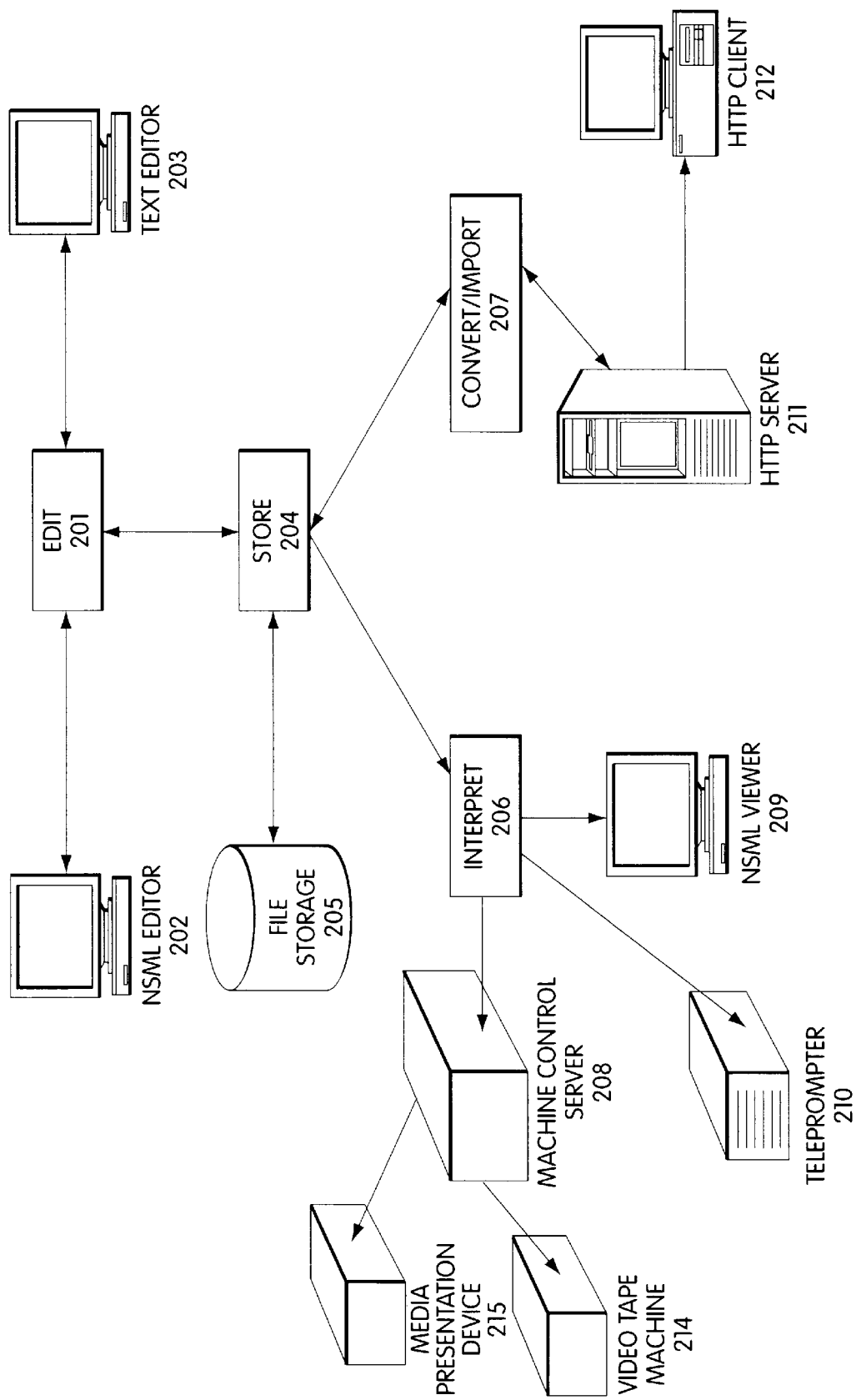
FIG. 2A is a block diagram illustrating several uses of a news story markup file.

Referring to FIG. 2A, and, as discussed above, the news story documents may be processed by a number of different parts of a news story production system. A news story document is generally an file with a particular document format. The news story document may be edited 201 by a text editor 203, such as xedit in the X-Windows and UNIX environments, or other well-known text editor. Alternatively, the news story document may be edited in a news story markup language (NSML) editor 202 that provides a WYSI- WYG view of a news story document. Also, the edited news story document may be stored 204 on a file storage 205 that may reside on a server 103 or a client 102 system on a network 111. In addition, news story documents may be interpreted 206 by different parts of the news story production system, including a machine control server, teleprompter 210, or NSML viewer 206.

In a preferred embodiment of the present invention, a news story document is generated in text comprising a specific character set. The character set allowed in tag names and attribute names is lower case a–z, upper case A–Z, numerals 0–9, a dot and a dash. The first character of a name is always in a set lower case a–z or uppercase A–Z. In the preferred embodiment, name may have a maximum of 12 characters. Within the text of the news story document, characters may be replaced with character entities. Character entities are useful when text contains NSML special characters used to markup an NSML document. Numeric character entities are 1–3 decimal digits proceeded by ampersand number sign (&#) and followed by a semi-colon (;). Leading zeros are ignored, so ampersand number sign 062 semicolon (>) is interpreted in the same manner as the character combination of ampersand number sign 62 (>). Standard NSML character entities that may appear in text include >, <, and & characters which represent the greater than (>), less than (<), and ampersand (&) characters, respectively.

Hidden text, or comments, may be included anywhere within an NSML document. Hidden text can be seen when viewing the form of the document. Standard SGML comment markup can be used to identify hidden text within a document. A comment includes any characters between the start (<!—) and end (—!>) tags.

In addition, news story documents may be converted or imported 207 to or from different file formats, such as HTML. When converting a news story document to an HTML document, the output HTML document may be stored on a HTTP server 211 and retrieved by an HTTP client 212. The HTTP client typically views an HTML document within an HTML viewer, such as the Netscape Navigator~ HTML viewer from the Netscape Corporation or the Microsoft Internet Explorer HTML viewer from the Microsoft Corporation. (Netscape is a registered trademark of the Netscape Corporation) A conversion mapping between NSML and HTML document formats is discussed below is detail with reference to FIG. 6. A news story document may also be created by importing information from other document formats, such as wire service information.

It is noted that news story markup language documents may be created by other methods, imported from other document formats, and converted to other document formats known in the art of document processing.

Figure 2B:
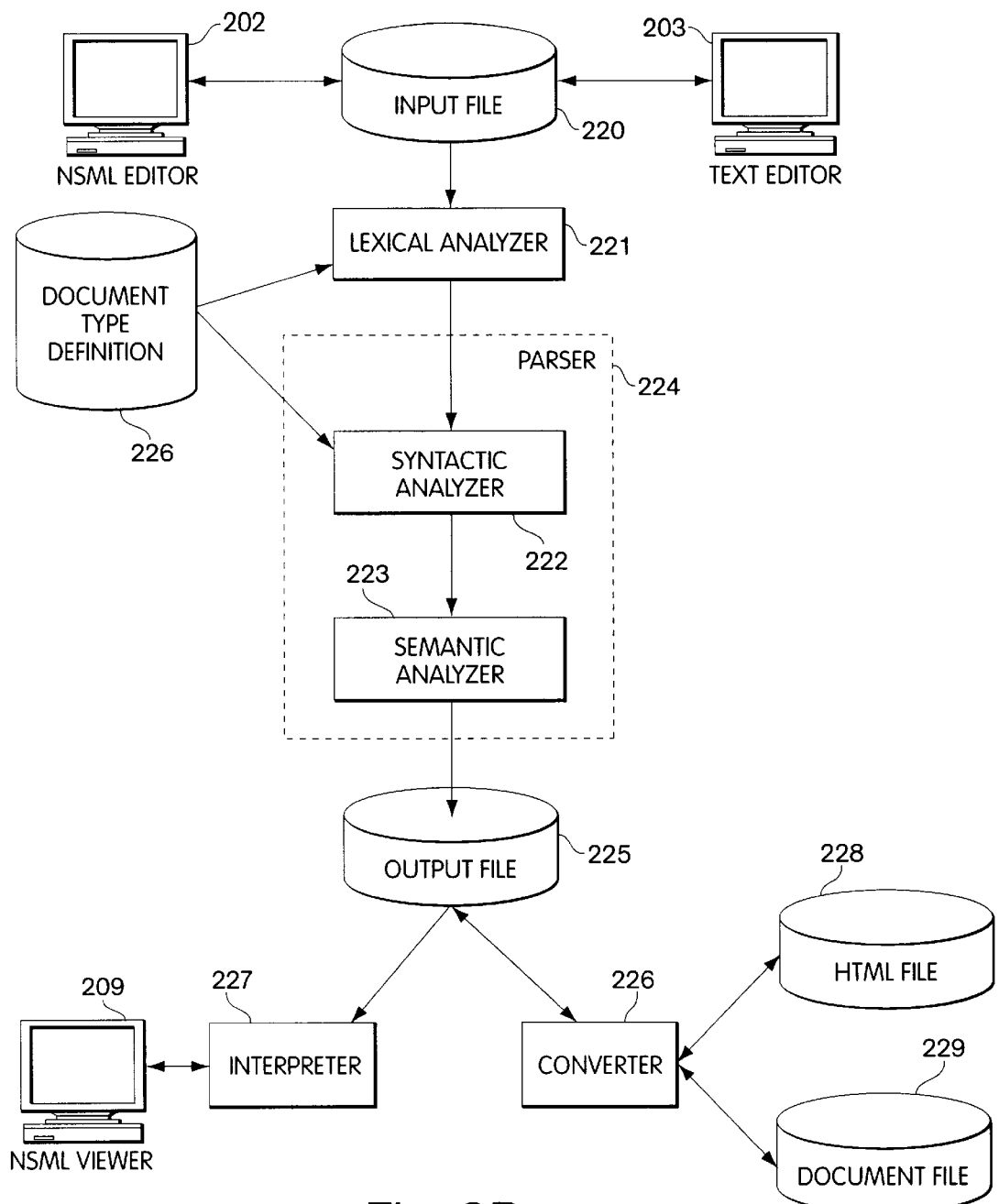
FIG. 2B is a block diagram of a system for processing a news story file.

Referring to FIG. 2B, parts of a news story production system may verify (or parse) an NSML document to validate the structure of the NSML document.

An input file 220 is created by a text editor, NSML editor, or other file creation agent, and is input into the validation system. A lexical analyzer 221 analyzes the format of the input file for elements and identifiers according to a document type definition 226, and produces an output stream of tokens and text based on the elements and identifiers. The output stream of tokens and text are directed into a parser 224 that verifies of the NSML document. The parser 224 includes a syntactic analyzer 222 and a semantic analyzer 223. The syntactic analyzer 222 is coupled to the output of the lexical analyzer 221 to accept the output stream of tokens and text. The syntactic analyzer 222 checks usage of the elements and identifiers according to the document type definition 226 and produces a parse tree from the tokens and text information. A semantic analyzer 223 generates an output file 226 having a hierarchical file structure based on the parse tree that conforms to the document type definition 226. During parser 224 operation, the parser 224 may automatically correct the news story document format, such as by replacing omitted tags and identifiers, or by filling in tags with default values. As a preferred option to such a parser 224, error information may be provided to the user or other agent that identifies when the parser 224 cannot correct a formatting error. Thus, the output file 226 is a verified form of the input file 220.

Parser elements such as a syntactic 222 and semantic 223 analyzer are elements that can be constructed for a particular SGML DTD. A particular DTD can be defined by one or more grammar rules, as described later below for an embodiment of the present invention in FIGS. 4A4C. Given a set of grammar rules that meet certain criteria, a parser may be constructed that verifies the format of a document. Parser creation is well known in the art of compiler theory and verification of document markup languages.

Figure 2C:
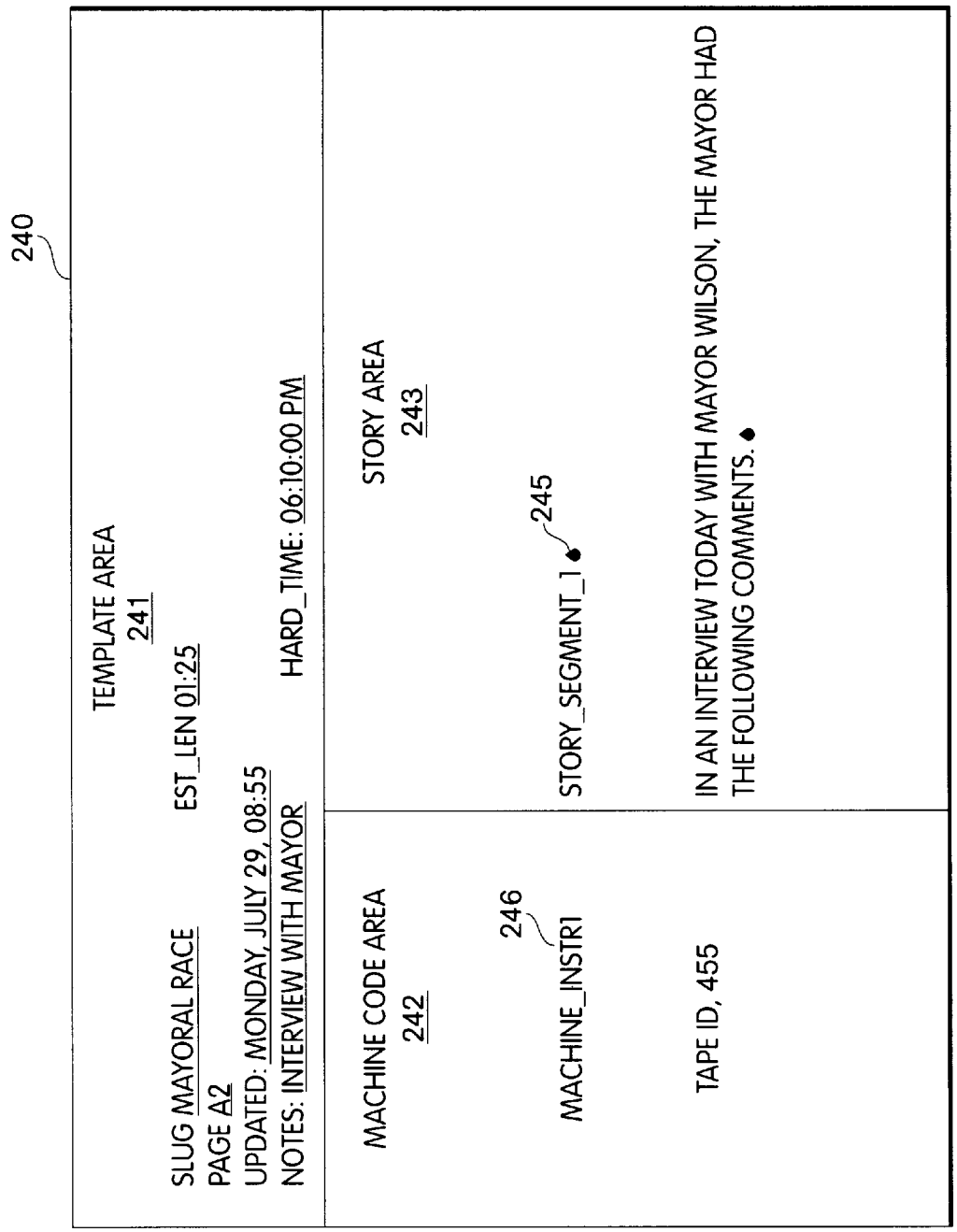
Figure 3C:
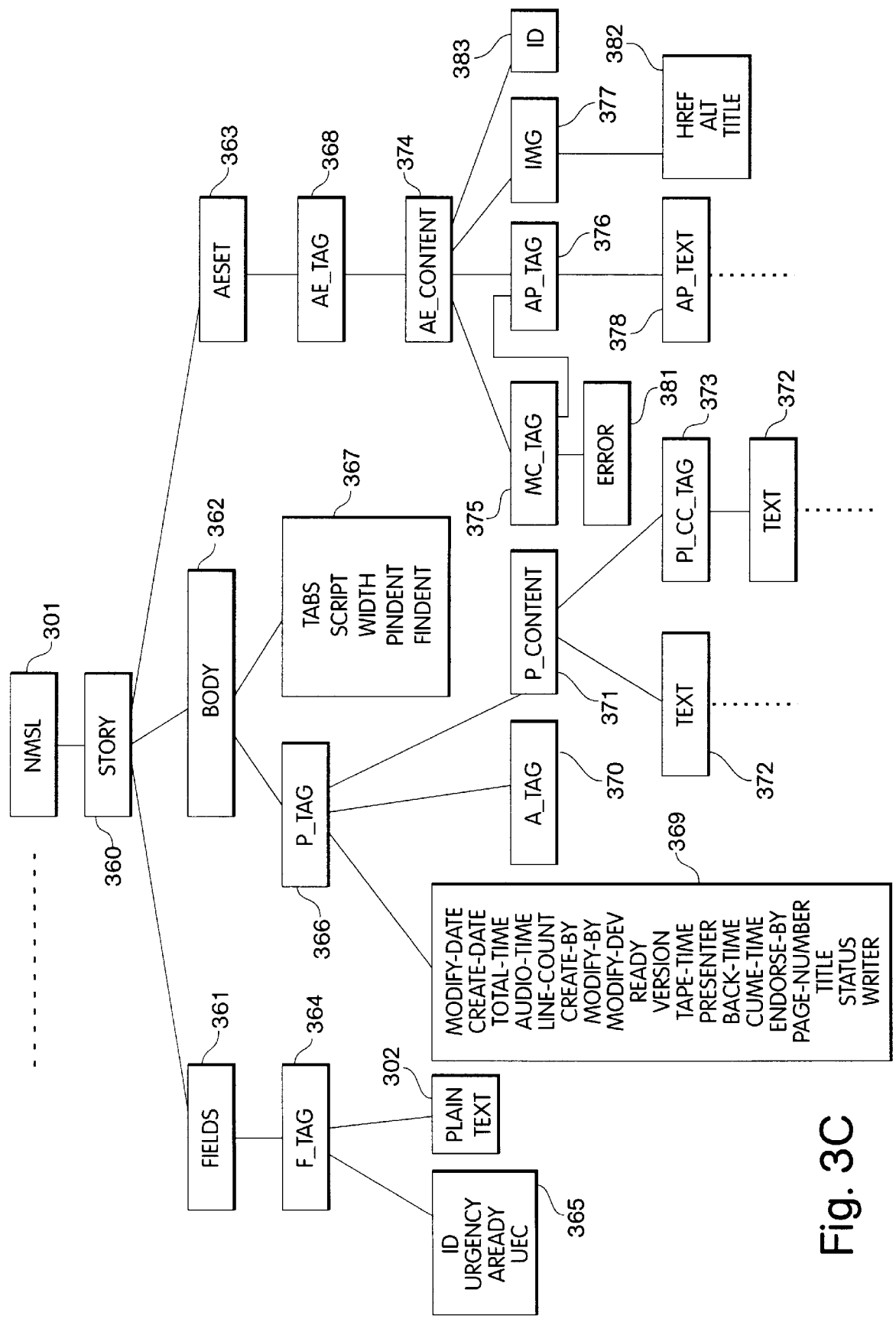
Figure 3D:
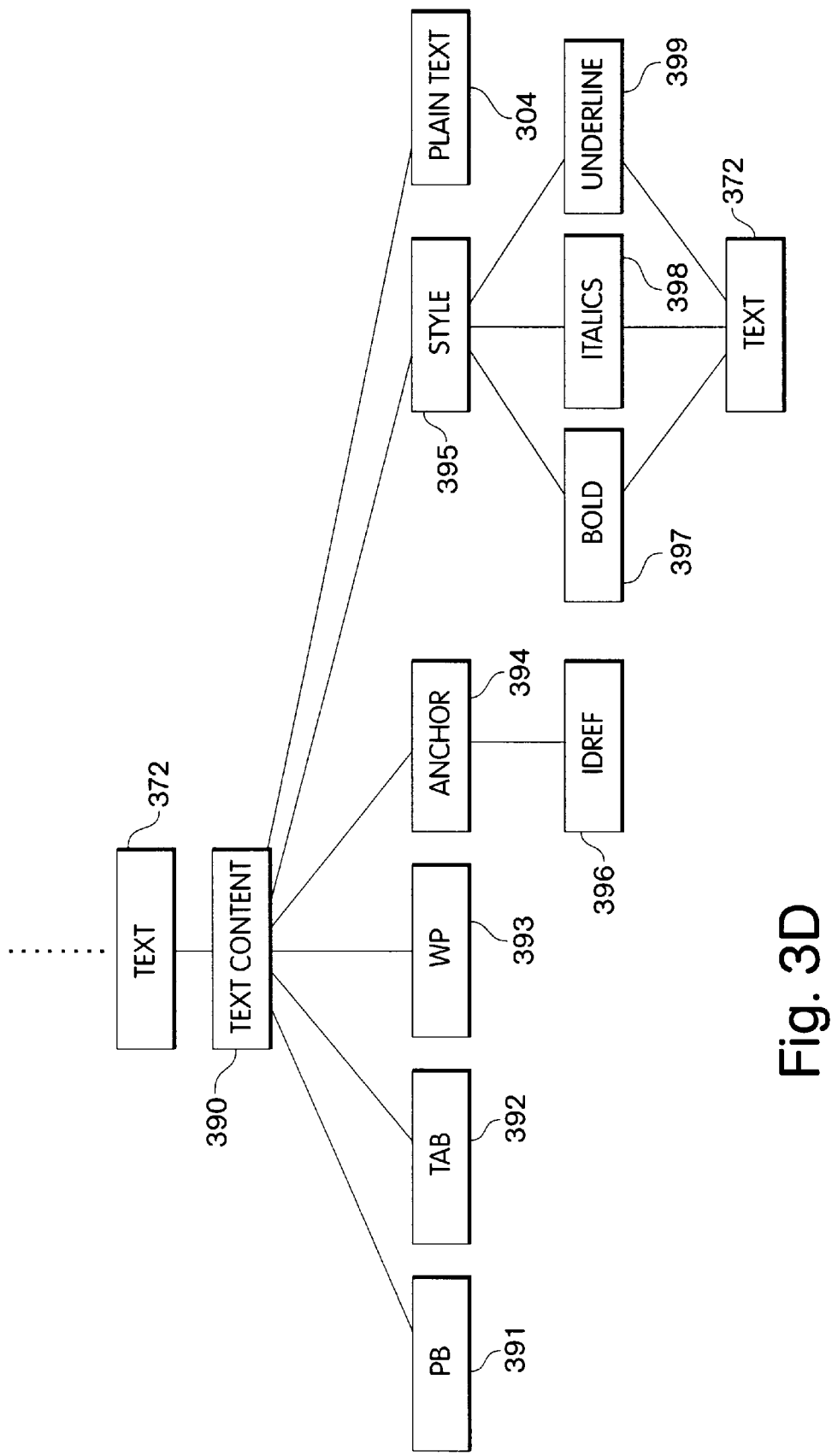
Figure 3E:
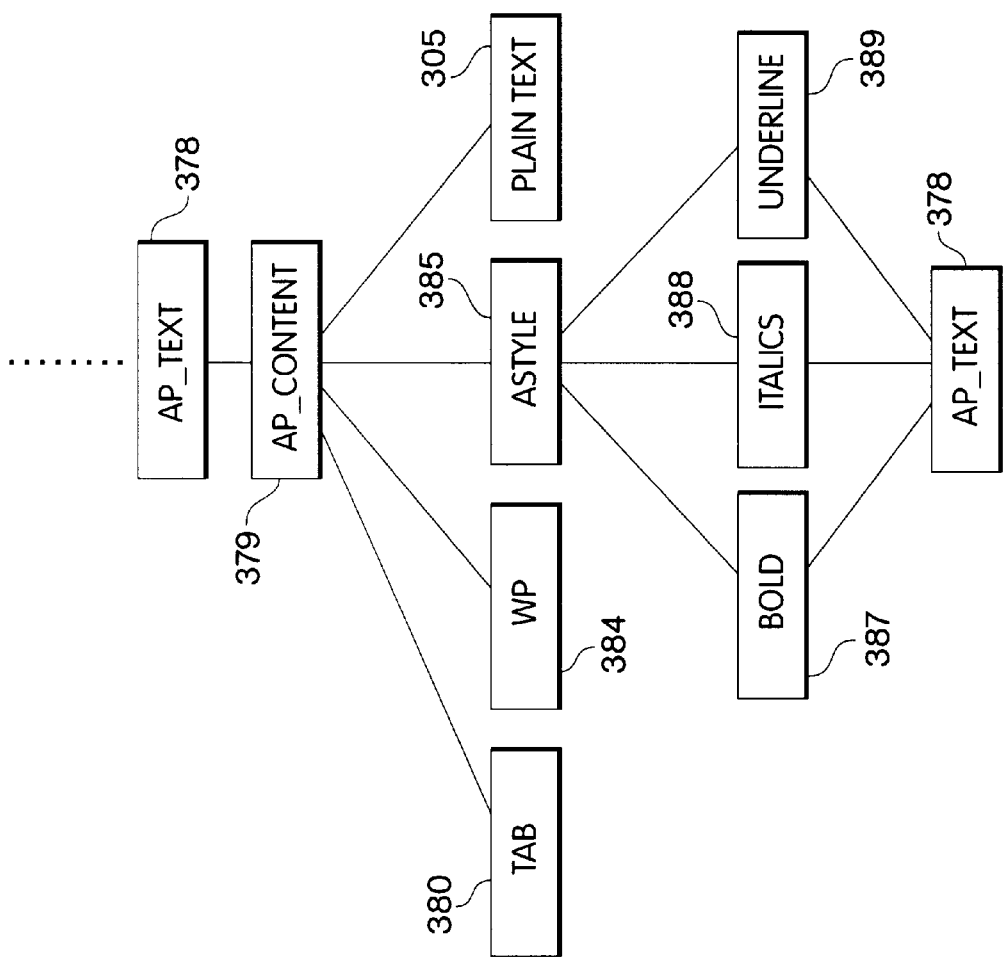

FIGS. 2C and 2D show graphical user interfaces that may be displayed by an NSML viewer 206. In FIG. 2C, an example screen for use by news broadcast personnel for a broadcast news production is shown. The example screen 240 includes a template area 241, a machine code area 242, and a story area 243. The template area 241 is used to contain metadata the news story. The template of the story either may be embedded in the story area or may be displayed separately in the template area 241. The machine code area 242 contains codes to control machines during broadcast. Each code is stored in a machine code object that contains all the text for the machine code and a corresponding insertion point which is visible in the story area 243 for the script. The story area 243 contains the text of the news story. In a script for a news story, the story area 243 contains the text that, for example, may be displayed on a teleprompter to be read by an anchor person. A reference mark 245 indicates the place within the story area where a machine instruction 246 should be executed. The reference mark 245 provides a link to the machine instruction 246. If a news story document is moved to another section of the news broadcast, or of the text associated with the reference mark is moved within the new story the corresponding machine instruction 246 would be moved with it. If the story was deleted from the broadcast, or if the text associated with the reference mark is deleted from the story, the corresponding machine instruction would be deleted.

FIG. 2D depicts another exemplary viewer screen, that may be used by news broadcast personnel during a news broadcast. The exemplary screen 250 contains a directory area 251, a queue area 252, and a story area 243. The story area 243 is identical to the story area 243 of FIG. 2C. From the directory area 251, a user may browse a server containing one or more news story documents. A news story document 254 with the title "Mayoral Race" may appear in a hierarchical structure of directories. The user may select news story 254 for use in the news broadcast. The queue area 252 may depict a particular order of news story documents for broadcast. The queue area 252 may include such information as news story document identification, runtime for a news story, and tape or machine control information.

Different screen types for a news story production system containing different elements of a news story document may be displayed in different areas of a viewer or editor program. A viewer that depicts a subset of the news story document information can be used according to the screen type. Thus, different users of the news story production system such as a director, producer, or announcer may view only the required information needed to perform a particular task.

In addition, the news story markup language described herein may be viewed by the system described in the U.S. patent application Ser. No. 08/832,868 filed on Apr. 4, 1997 by Joseph Porrka and Bruce Dawson entitled NEWSROOM USER INTERFACE INCLUDING MULTIPLE PANEL WORKSPACES.

Structured documents in electronic form may include text content, descriptive markup and possibly non-text content. The descriptive markup of an input document can be interpreted as an ordered hierarchy of elements that contain tags, identifiers, and text, such as those depicted in FIGS. 3A through 3E. That is, the descriptive markup defines a structure including a set of elements which, when taken together, form a tree or similar hierarchial object.

As shown in FIGS. 3A through 3E, an NSML document includes a main element NMSL 301 that contains all other elements. In one embodiment of the invention, the NMSL element 301 includes a HEAD element 320, a LOOK element 340, and a STORY element 360. Individual elements correspond to entities appearing in a viewer or NSML editor. The HEAD element 320 contains the news story metadata information. As described above, metadata information is information about a story or attached to a story that is not strictly content of the story. The LOOK element 340 contains information that can alter the appearance but not the meaning of the news story content. The STORY element 360 encloses the news story content. News story content would, for example, be read by a newscaster from a teleprompter or would appear in a viewer in the story area 243.

It is noted that one or more of the elements of FIGS. 3A through 3E are not required, and hence, may not exist in a particular NSML document. Non-essential elements are elements that are not required according to the NSML document format. Non-essential elements of one embodiment of the present invention are further defined by the NSML grammar rules depicted in FIGS. 4A–4C and described later below.

In FIGS. 3A–3E, the HEAD element 320 contains the meta element 321 and the content element 322. The META element 321 defines metadata information about a story. The META element 321 can have a number of attributes 323. These attributes 323 include the WIRE attribute that indicates that the news story document is an original, unmodified news story received from a service provider. The value of the WIRE attribute indicates the priority of the wire and can be a value of flash, bulletin, urgent, routine, or other. If the WIRE attribute not present, the news story document is not a wire story.

The MAIL attribute is optional. If present, the MAIL attribute indicates that the news story is an original, unmodified document received as a mail message. The value of the MAIL attribute indicates both whether the receiver of the mail message has viewed the mail message and whether the message is either read or unread. If the MAIL attribute is not present, the news story document is not a mail message.

The LOCKED attribute is optional. The LOCKED attribute, if present, indicates that the news story document has been locked by a user. A user may restrict access to a news story document by locking it in several ways. If the value of the LOCKED attribute is passed, then access is granted to users that can supply the correct password. If the value of the LOCKED attribute is user, then access is granted to the news story document only to the user who locked the news story document. If the LOCKED attribute is not present, the news story document is not locked.

The WORDS attribute is optional. If the WORDS attribute is present, its value is a decimal number that specifies the number of countable words in the body of the news story document. Countable words are those words that contribute to the read time of a story. If the WORDS attribute is not present, the number of words is assumed to be zero.

The RATE attribute is optional. The RATE attribute, if present, is a decimal number that specifies the read rate to be used to calculate read time. The read rate is in words per minute. If the RATE attribute is not present, the read rate is assumed to be zero.

The BREAK attribute is optional. The BREAK attribute, if present, indicates that the news story document is a story in a rundown that marks a break or divider between segments of the rundown period.

The MCSERROR attribute is optional. The MCSERROR attribute if present, indicates that the news story document is a story in a rundown that contains machine control instructions and at least one of the machine control instructions cannot be understood by a machine control subsystem.

The HOLD attribute is optional. The HOLD attribute, if present, indicates that the news story document is not eligible for automatic purge. A user may use this attribute to place a hold on a document that should be protected from an automatic database news story purge by a news story server.

The FLOAT attribute is optional. The FLOAT attribute, if present, indicates that the news story document is a story in a rundown that has been "floated" by a user. A floating story is a story in a rundown that is not yet selected as a story to go on air.

The DELETE attribute is optional. The presence of a DELETE attribute indicates that the news story document has been deleted from the database. The CONTENT element 322 expresses miscellaneous information attached to or about a news story document.

The RGROUP 324 and WGROUP 325 elements are optional. The RGROUP 324 and WGROUP 325 elements contain names of a read group and a write group, respectively, assigned to the news story. Read and write groups identify groups of users on the news story production system that can be assigned a particular news story. If the RGROUP 324 and WGROUP 325 elements are not specified, the news story document has no groups assigned to it.

The SOURCE element 326 is optional. If specified, the SOURCE element 326 contains the name of a news story server that generated the news story document. The DIST element 327 is optional and includes a distribution code that identifies the users that should receive a copy of the news story document. The user may attach a distribution code to a news story document.

The WCODE element 328 is optional. The WCODE element 328, when specified, the news story document originated as a wire story from a wire service provider and the WCODE element 328 contains wire distribution codes assigned to the wire story when it was originally received.

The FORMNAME element 329 is an element associated with the form that was used to create the first instance of the news story document. The STORY ID element 330 includes an identification string used by a news story server, i.e., database, to locate a news story document.

The LOOK element 340 contains the FORM element 341, the ROW element 342, and the CELL element 343. The FORM element 341 encloses a presentation description for elements of a story. The FORM element 341 does not contain any story content in one embodiment of the present invention. Story content is defined within a STORY element 360 described below. A FORM is a definition of the layout of the STORY elements 360 on the screen in a viewer or editor program. The FORM element 341 is optional.

The FORM element 341 may contain a number of attributes 344. The attribute VT identifies that the news story has been designed for use on a video terminal. The GI attribute indicates that the news story document has been designed for use on a graphical interface. The VT and GI attributes are optional. When neither the VT or GI attribute is present, the GI attribute is assumed.

The STYLE attribute is optional. The STYLE attribute, when specified, defines the physical style, for example, bold, italic, or underlined of the content displayed in a FORM. If the STYLE attribute is not specified, the FORM inherits a style from one of one or more parent elements.

The ALIGN attribute is optional. The ALIGN attribute, when specified, defines the alignment of the element content displayed in the FORM. The ALIGN attribute, for example, may be one of left, right, or center. If the alignment attribute is not specified, left alignment is assumed.

The RO attribute is optional. A FORM can be either read-write or read-only, depending on the behavior inherited from a parent element. A FORM may override the read-write access by specifying the RO attribute. The LEFT, RIGHT, LTOP, LBOTTOM attributes are optional. The vertical bar indicates an exclusive "OR" operation, that is, one attribute or another must be chosen. Thus, only one of the attributes may appear in a FORM element. The LEFT, RIGHT, LTOP, and LBOTTOM attributes determine the placement of a label relative to the FORM element 341. If the LTOP, LBOTTOM, left, right are not specified, LTOP attribute is assumed.

The LSTYLE attribute is optional. The LSTYLE attribute, if specified, defines a physical style of the FORM 341 label. If the LSTYLE attribute is not specified, the FORM label inherits a style from a parent element.

The LALIGN attribute is optional. The LALIGN attribute when specified, defines the alignment of the FORM label. The value of the LALIGN attribute may be one of left, right, or center. If the LALIGN attribute is not specified, left alignment is assumed.

The ROW element 342 includes group of CELL elements 343 that are to appear in order on the same row when displayed in an editor or viewer. All attributes 345 of the ROW 342 are optional and are similar in function to attributes 344 of FORM element 341.

The CELL element 343 is used to define a presentation area for a single field of a news document. The CELL element 343 contains a number of attributes 346. The IDREF attribute is optional. The value of the IDREF attribute identifies the element content from the FIELDS element 361 that is to be displayed in a cell. If the IDREF attribute is not specified, the cell is assumed to be blank and read-only. The CELL element 343 also may contain plain text 303 that defines the text of the cell label. According to this embodiment, the CELL element 343 has a single label.

The LENGTH attribute is optional, and if specified, defines the length of the cell. If the LENGTH attribute is not specified, the length of the cell is assumed to be zero. The STYLE, ALIGN, RO, LEFT, RIGHT, LTOP, LBOTTOM, LSTYLE, and LALIGN attributes are similar to those described for FORM element 341.

The LLENGTH attribute is optional. The LLENGTH attribute, when specified, defines the length of the cell label. If the LLENGTH attribute is not specified, the length of the cell label is assumed to be a value of zero.

The LTOP, LBOTTOM, LLEFT, and LRIGHT attributes are optional. Only one of the LTOP, LRIGHT, LLEFT, and LBOTTOM attributes may appear in the CELL element 343, and these attributes determine the placement of the label relative to the cell.

The AREADY attribute is optional. The AREADY attribute, if specified, indicates that the field reference by the cell IDREF attribute is to acquire the AREADY attribute when a new news story is created.

The STORY element 360 represents the primary content of a new story. The STORY element 360 includes a FIELDS element 361, the BODY element 362, and the AESET element 363. The FIELDS element 361 contains fields related to the story. The BODY element 362 includes elements that define the story text content. The AESET element 363 defines the set of anchored elements within a new story.

The FIELD element 361 contains the F_TAG element 364 that defines field content. The F_TAG element 364 includes a number of attributes 365.

The ID attribute in this embodiment is required by the F_TAG element 364. The value of the ID attribute is a string of characters that uniquely identifies the field in the new story so that it may be referenced and used. The ID attribute is referenced by the IDREF attribute of the CELL element 343. Each new story has only one field with a specific ID value. The ID attribute may have some reserved values that identify fields with specific meaning or contain system supplied content. The F_TAG element may include any plain text 302 associated with an identifier.

The URGENCY attribute is optional. The URGENCY attribute can be a single digit used as a cue in a viewer application that provides some exceptional meaning to a field. The URGENCY attribute may bring information to the attention of the user.

The AREADY attribute is optional. The AREADY attribute, if specified, indicates that the content of the field effects the contents the content of the READY attribute 369 of P_TAG element 366. Specifically, if any element with the AREADY attribute has a question mark as the first character of its content, the READY field will have a question mark as its content.

The UEC attribute is optional. The UEC attribute, if present, indicates that a user has entered content to override the system supplied content normally provided in the field.

The BODY element 362 contains the P_TAG element 366 and the AE_TAG element 368. The BODY element 362 also includes a number of attributes 367.

The TABS attribute indicates that the next character is to start at the next tab position.

The TABS attribute is optional. The TABS attribute defines the tab stop positions for all tabs within the text. The positions are defined by a list of numbers. Each number in the list is a distance from the last stop. The last value in the list may be a dash. The dash indicates that the last number in the list is to repeat indefinitely.

The SCRIPT and WIDTH attributes are optional. The SCRIPT and WIDTH attributes are used to preserve margin settings using for a word wrapping by the last text editor or NSML editor that modified the story. The value specified by WIDTH is the width in points used to wrap the text contained in the BODY element 362. The value specified by SCRIPT is the width in points used to wrap the text in incurred elements. The SCRIPT attribute, if absent, indicates the story is not scripted.

The PINDENT attribute is optional. The PINDENT attribute is a decimal number the defines the paragraph indent for all paragraphs in the body of a story. The PINDENT value is expressed in points from the left margin. If the PINDENT attribute is not set, the value of the PINDENT attribute is assumed to be zero value.

The FINDENT attribute is optional. The FINDENT attribute is a decimal number the defines the indent for the first line of all paragraphs in the body of a new story. The FINDENT value is expressed in points from the left margin. If the FINDENT attribute is not set, the value of the FINDENT attribute is assumed to be zero value.

The P_TAG element 366 includes the A_TAG element 370 and the P_CONTENT element 371. The P_TAG also includes a number of attributes 369.

Attributes 369 include MODIFY-DATE that indicates the date when the news story document was last modified. The CREATE-DATE attribute represents the creation date of the NSML document. The TOTAL-TIME attribute is a value of the total news story time in 25 seconds, or the sum of the audio time and tape time defined below.

AUDIO-TIME attribute represents the audio retime of a news story in seconds. The AUDIO-TIME attribute can be based on read rate and word count or can be user entered. The LINE-COUNT attribute represents the number of lines in a news story document. The CREATE-BY attribute represents the user name of the creator of the first version of the news 30 story document. The MODIFY-BY attribute represents the user name of the last modifier of the story. The MODIFY-DEV attribute indicates that the device name on which the news story was last modified, for example, the modify device name could be A journalist terminal, such as a NSML editor.

The READY attribute indicates the state of the news story. The READ attribute can have a value of "READY" or "?", indicating if the news story is ready for broadcast. The VERSION attribute indicates the version number of the news story.

The TAPE-TIME attribute indicates the run time in seconds of a tape to be played with a news story. The PRESENTER attribute indicates the name of the person who will read the story during the news story broadcast.

The BACK-TIME and CUME-TIME attributes according to this embodiment have a special encoding. The BACK-TIME attribute indicates the hard-time of the story in seconds. The in-time of the story is the start of the news story broadcast. The CUME-TIME indicates the hard-time of the story in seconds. The out-time of the story is a time during the broadcast that the story terminates. The hard in-time and hard out-time are expressed in seconds as either a relative time or an absolute time, as in the time of day. The BACK-TIME and CUME-TIME attributes are assumed to be relative time unless the first character of the attribute value is an ampersand character "@". For example, a BACK-TIME content of "600" specifies a hard in-time of 10 minutes relative to the start of the news story broadcast. A BACK-TIME content of "@600" specifies a hard IN-TIME of 12:10:00 AM.

The ENDORSE-BY attribute indicates the name of the user who endorsed the news story. The PAGE-NUMBER attribute indicates the user entered story identifier, or the identification of the story. The TITLE attribute indicates a user entered story title, or the title of the news story. The STATUS attribute indicates the status of some element of the news story. The WRITER attribute indicates the name of the writer taking credit for the story.

The A_TAG element 370 inserts a reference point to an anchored element. The A_TAG element 370 marks a spot within a paragraph of the document body at which an anchored element is referenced. Order and position of anchors within a document are intended to determine the order an position of anchored elements when displayed by a program, such as a viewer.

The P_CONTENT element 371 defines a paragraph of text within the news story document. 371. The P_CONTENT element 371 includes the TEXT 372 and PI_CC_TAG element 373. The PI_CC_TAG element 373 includes text that are instructions to the presenter to be read on air that is not to be included in the timing of the news story or displayed on the teleprompter. Alternatively, the PI_CC_TAG element 373 includes text which is not read by the presenter during broadcast, but is part of a package which is closed-captioned, and thus is not included in story timing of displayed on the teleprompter. The PI_CC_TAG element 373 may also include the TEXT element 372 described below.

The TEXT element 372 includes the TEXT CONTENT element 390 that includes text, physical style, spacing and layout information. The TEXT CONTENT element 390 includes the PB 391, TAB 392, WP 393, ANCHOR 394, and STYLE 395 elements. The TEXT CONTENT element 390 also may include plain text 304 that is unchanged by STYLE elements 395. The PB element 391 indicates a page break at the point where the element is located in the news story document. The TAB element 392 indicates that the next character in the news story document starts at the next tab position in the document. The WP element 393 indicates where wordwrapping was performed by the last application to modify the text of the news story document. Wrap points may be used by an application such as NSML viewer to present text of the story with the same appearance of the text last appeared within an editor. The ANCHOR element 394 is used to insert a reference to an anchored element. The ANCHOR element 394 marks a spot within a paragraph of the document at which an anchored element is referenced. Order and position of anchors determine order and position of anchored elements when displayed by an application such as an NSML viewer. The ANCHOR element 394 includes an attribute 396 IDREF. The IDREF attribute is required, and identifies a specific anchored element in the AESET element 363 referenced by the AE_TAG element 368.

The STYLE element 395 includes elements that enhance text when presented to the user. The STYLE element 395 includes the BOLD 397, ITALICS 398, and the UNDERLINE 399 elements. The BOLD 397, ITALICS 398, and the UNDERLINE 399 elements render enclosed text (TEXT element 372) as a particular style. STYLE elements 395 may be used in combination to present different combinations of text effects. STYLE elements 395 also may include other TEXT elements 372.

The AESET element 363 defines the set of anchored elements within a news story. The AESET 363 includes the optional AE_TAG element 368. The AE_TAG element 368 includes an anchored element. An anchored element is an object that is anchored at a specific position in the body of a news story document. Objects are displayed in a manner dependent on the object content and the application displaying the object. Anchored elements are referenced by A_TAG elements 370 appearing in the BODY element 362 in the news story document.

The AE_TAG element 368 includes the AE_CONTENT element 374 that defines the content of the anchored element. Anchored elements are referenced by anchors (A_TAG elements 368) within body paragraphs (P_CONTENT element 371). The AE_CONTENT element 374 includes the MC_TAG 375, AP_TAG 376, AND IMG 377 elements. The AE_CONTENT element 374 also includes an attribute 382 referred to as ID.

The ID attribute in this embodiment is required by the AE_CONTENT element 374. The value of the ID attribute is a string of characters that uniquely identifies the field in the new story so that it may be referenced and used. The ID attribute is referenced by the IDREF attribute of the BODY element 362. The attribute ID appears once within an anchored element set (AESET element 363).

The MC_TAG element 375 defines a set of instructions used for machine control. The MC_TAG element 375 includes machine control instructions that are understood by a machine control server 208. The MC_TAG element 375 includes an optional attribute ERROR 381 that indicates that the machine control server 208 was not able to understand or carry out machine control instructions contained within the MC_TAG element 375. The MC_TAG element 375 also may include the AP_TAG element 376 described below.

The AP_TAG element 376 defines a paragraph of text in an anchored element. The AP_TAG element 376 includes the text of a paragraph in an anchored element. The AP_TAG element 376 includes the optional AP_TEXT element 378, which in turn, includes the AP_CONTENT element 379. The AP_CONTENT element 379 contains the text of the anchored element. The AP_CONTENT element 379 includes similar elements to the TEXT element 372, however, in this embodiment, the AP_CONTENT element 379 does not contain page break (PB 391) or anchor (ANCHOR 394) elements. Specifically, the AP_CONTENT element 379 contains plain text 305, TAB 380, WP 384, BOLD 387, ITALICS 388, and UNDERLINE 389 attributes similar to the elements of the same name of the TEXT element 372. The ASTYLE element 385, includes elements that enhance text when presented to the user, similar to the STYLE element 395. A STYLE element 385 may contain additional AP_TEXT elements 378.

The IMG element 377 includes information for displaying an image in a display such as a display of an NSML viewer 209. The IMG element includes a number of attributes 382.

The HREF attribute in this embodiment is required by the IMG element 377. The HREF attribute has a value of a location of the image, such as a Uniform Resource Locator (URL), that identifies the image to be displayed.

The ALT attribute is optional. The ALT attribute, if specified, identifies a text string to be displayed in the event that the referenced image cannot be located or otherwise cannot be viewed in the display.

The TITLE attribute is optional. The TITLE attribute, if specified, identifies a text string which is to be displayed in conjunction with the image. The text string can be a title or other descriptive text associated with the image.

Significantly, elements of the NSML include elements specific to a news story broadcast. Elements are included in NSML for defining a timing information a news story, and for defining machine control elements for controlling a machine control server to automate control functions. Also, anchoring elements are included for synchronizing elements, such as elements within the BODY 362 and AESET 363 elements within the news story document.

It should be understood that the news story markup language is not limited to the elements described herein. Additional elements that may be added that describe other features of a news story are well within the scope of the present invention.

Elements of a story can be identified with NSML tags. NSML tags are organized in a hierarchy, such as a tree structure. At the top of the hierarchy is the <nsml> tag that delimits a NSML document and contains the story meta information, content and story presentation elements. The other elements of a story are nested inside these elements as described by an NSML grammar described in detail later in reference to FIGS. 4A–4C. The hierarchy of elements of tags, and identifiers defines format of a markup language document.

Similar to a spoken language or computer programming languages, a markup language has a series of rules that describe how markup elements are ordered within the markup language document. In essence, markup language may be understood as a simple programming language. The markup elements can be described by a series of grammar rules, or grammars, that describe the syntax of the markup language.

Backus-Naur form is a standard system of notation that is used to describe a grammar rule. The ":==" characters are interpreted as "defined as" or "equal to". The "{}" notation surrounding an element means zero or more of the elements may me used. The character "|" appearing between two element is interpreted as an "OR" operation. Consider the following example grammar rule:

$$A:==BC\{D\}|E$$

The example grammar rule is interpreted as "Element A is defined as a sequence of element B and element C and zero or more of element D, or element A is defined as element E".

Thus, the element A may be defined as "BC", "BCD", "BCD . . . D" or "E". Elements appearing between "{" and "}" characters are commonly referred to as non-essential elements, and therefore 5 are not required in the definition of the particular element. Elements appearing between "[" and "]" (not shown) characters are commonly referred to as essential elements, and are thus required in the definition of the particular element.

Referring to FIGS. 4A–4C, the NSML elements are defined according to grammar rules. Grammar rules define the ordering and nesting of the tags and elements. In addition, the grammar rules define essential and non-essential elements of the NSML document. In addition, an NSML parser and NSML DTD may insert certain omitted tags into a document or supply default values for particular elements. For example, when, as in the grammar rule of the NSML element 301, required elements HEAD 320, LOOK 340, and STORY 360 are omitted from an NSML document, a parser may created these required elements in the output file.

Consider the grammar rule associated with the NSML element 301. The NSML element 301, according to its associated grammar rule is defined by a start tag <nsml> and an end tag </nsml>. A HEAD element 320, LOOK element 340, and STORY element 360 are located between the start tag and end tag for the NSML element 301. According to the grammar rule associated with the NSML element 301, the NMSL element 301 is a parent element, an the HEAD 320, LOOK 340, and STORY 360 elements are children of the NSML element 301.

The HEAD element 320 is, according to its associated grammar rule, delimited by a start tag <head> and an end tag </head>. The META 321, RGROUP 324, WGROUP 325, SOURCE 326, DIST 327, WCODE 328, FORMNAME 329, and STORY ID 330 elements are located between the start tag and end tag for the HEAD element 320. According to the grammar rule associated with the HEAD element 320, the associated start tags, end tags, and content such as plain text are located within a <head> start tag and a </head> end tag. It is noted that in some cases, start tags and end tags can be inferred by a parser or viewer program, and thus may be optional.

The LOOK element 340 is, according to its associated grammar rule, delimited by a start tag <look> and end tag of the LOOK element 340. The FORM 341 element is located between the start tag and end tag for the LOOK element 340.

The STORY element 360 is, according to its associated grammar rule, delimited by a start tag <story> and an end tag </story>. The FIELDS 361, BODY 362, and AESET 363 elements are located between the start tag and end tag for the STORY element 360.

Similarly, remaining elements are defined according to their associated grammar rules as shown in FIG. 4A–4C, which are self-explanatory.

It is noted that the language of the present invention is not limited to the grammar rules described herein. Additional grammar rules may be added to support tags for added fields to the news story markup language, as required.

An example NSML document 500 is shown in FIG. 5. As discussed above, NSML document may be defined as ASCII characters which represent the NSML tags and related content, and may be viewed in a text editor 203. The NSML document begins with the <nsml> start tag 501, that generally begins an NSML document. A corresponding </nsml> end tag end san NSML document. The <look> tag 502 begins the look section of the document.

Within the AESET element 363, one or more AE_TAG elements 368 may exist. In example NMSL document 500, there are two AE_TAG elements 519, 520. Specifically, AE_TAG 520 references a machine control instruction named "CG" 521. As discussed above with reference to FIG. 3, AE_TAG 368 can contain zero or more of MC_TAG 375, AP_TAG 376, and IMG 377 elements. AP_TAG 376 is included as element 519, enclosing text in an anchored paragraph. The end tag characters "</ae_set>" 522 marks the end of the AE SET element 363. The end tag characters "</story>" 523 mark the end of the STORY element 360. The end tag characters "</nmsl>" 524 mark the end of the NSML document 500.

The NSML document depicted in FIG. 5 is shown by way of example only, and should not be considered as a limitation of the markup language of the present invention.

As discussed previously with reference to FIG. 2A and 2B, an NSML document may be converted to another format such as HTML. FIG. 6 is a table that shows an exemplary conversion 207 between NMSL format to HTML format from an NSML document. Specifically, in this embodiment, it is desired to translate the news story information into a format suitable for publication over a network such as the Internet. When converting 207 NSML information for publication on the Internet, NSML information such as machine code information may not be useful for an HTTP client 212 located on the Internet and thus may be omitted in a translation or conversion process. Information such as STORY element 360 content may contain information suitable for use by an HTTP client 212.

Referring to FIG. 6, start tag <nsml> and stop tag </nsml> are converted to a start tag <html> and stop tag </html> suitable for an HTML document. Similarly, literals such as "<" and ">" are converted into HTML equivalents > and <, respectively. For different text styles, such as bold text, associated NSML bold text is inserted between start tag <b> and end tag </b> used in HTML for marking bolded text. There are elements within the NSML document format that have no corresponding element type in HTML, such as for bold reverse text. In this case, a mapping to one or more existing HTML tags is made to translate the information. If a particular portion of information in the NSML document is not required in the resultant HTML document, the particular portion of information may be dropped during the conversion process. As discussed previously with reference to FIG. 2B, the conversion may be performed by a parser modified to make substitutions or deletions to a document as defined by a conversion table such as table 600.

It should be understood that files written in such a markup language may be converted to other types of documents, as necessary. Such document types can include, but are not limited to, WORD, POSTSCRIPT, WordPerfect, ASCII, PDF®, or other suitable format. (WORD is a registered trademark of the Microsoft Corporation, POSTSCRIPT and PDF are registered trademarks of Adobe Systems Corporation, and WordPerfect is a registered trademark of the Corel Corporation.)

The news story markup language described herein may be used for a specialized computer system for producing a television news broadcast. However, embodiments of the invention are not limited to a news broadcast; the present invention may be used in other media production environments as well, such as a radio broadcast production and a television entertainment production.

It should also be understood that the features of the markup language described herein may be applied to other markup languages by one skilled in the art of markup language design. Features of the markup language described herein are considered well within the scope of the invention.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A process for processing markup language documents relating to a news story, comprising the steps of:

reading an input file having a first file format including a plurality of elements, the input file further including at least one of:

timing information for representing distribution timing of the news story; and synchronization information for synchronizing a distribution of one of the plurality of elements with a distribution of another of the plurality of elements;

the input file further including news story information for representing the news story; and verifying the first file format of the input file based on a document type definition defining a news story markup language.

2. The process of claim 1, further comprising the steps of:

producing output data having a second file format wherein the second file format is formatted according to the document type definition; and creating an output file based on the output data.

3. The process of claim 2, further comprising a step of converting the output file to a document file having a format different than the format of the output file.

4. The process of claim 3, wherein the format of the document file is HTML format.

5. The process of claim 3, wherein the step of converting includes the step of excluding information from the output file when converting the output file to the document file format.

6. The process of claim 1, further comprising a step of importing an import file having a file format different than the first and second file formats to produce an imported file having a format according to the document type definition.

7. The process of claim 6, wherein the step of importing includes the step of adding step import file information to a template document having a format according to the document type definition.

8. The process of claim 1, further comprising a lexical analysis step of analyzing the input file format for a plurality of elements and identifiers, and of producing an output token stream based on the plurality of elements and identifiers.

9. The process of claim 1, wherein the step of verifying further includes the steps of:

checking usage of a plurality of elements and identifiers according to the document type definition to produce a parse tree from the plurality of elements and identifiers; and generating an output file having a hierarchical file structure based on the parse tree that conforms to the document type definition.

10. The process of claim 9, further comprising a step of interpreting the output file by a viewer.

11. A data processing system for interpreting a news story markup language document, the system comprising:

means for obtaining a news story markup language document from a storage location;

means for parsing the news story markup language document, producing a plurality of markup language tags and associated text;

means for converting the plurality of markup language tags and associated text to system instructions; and means for converting one of said plurality of markup language tags and associated text to a machine control instruction for execution by a machine control server.

12. The data processing system of claim 11, further comprising means for rendering the system instructions as a visual interpretation of the news story markup language document.

13. The data processing system of claim 11, wherein the machine control server controls a media presentation device based upon the machine control instruction.

14. A data processing system for interpreting a news story markup language document, the system comprising:

means for obtaining a news story markup language document from a storage location;

means for parsing the news story markup language document, producing a plurality of markup language tags and associated text;

means for converting the plurality of markup language tags and associated text to system instructions;

a teleprompter; and means for displaying story information in the teleprompter.

15. A method of anchoring document text to a control field in the same electronic document in an electronic document editor, comprising the steps of: creating an electronic document in a markup language, said electronic document including a declarative tag enclosing the document text;

creating the control field in the electronic document, the control field having a unique identification and containing machine control information for controlling a machine control server;

referencing, at a location within the document text, the control field by the unique identification.

16. The method of claim 15, wherein the markup language is a news story markup language having news story information for representing content of the news story, the news story information including:

look information for controlling appearance of news story information; and head information for identifying the news story.

17. The method of claim 16, wherein the machine control information identifies a presentation element associated with a media presentation device.

18. The method of claim 16, wherein the presentation element is a video element.

19. A data processing system for viewing a markup language document having a plurality of elements, the system comprising:

means for obtaining a markup language document from a storage location;

means for parsing the plurality of elements of the markup language document, producing a plurality of markup language tags and associated text, wherein the markup language document further includes at least one of:
    timing information for representing distribution timing of the markup language document;
    synchronization information for synchronizing a distribution of one of the plurality of elements with a distribution of another of the plurality of elements;

means for converting said markup language tags and associated text to system instructions; and means for rendering the system instructions as a visual interpretation of the markup language document.

20. The data processing system of claim 19, wherein the markup language document includes news story information for representing content of a news story, the new story information further including:

look information for controlling appearance of news story information; and head information for identifying the news story.

* * * * *